United States Patent [19]

Morningstar et al.

[11] Patent Number: 5,513,151
[45] Date of Patent: Apr. 30, 1996

[54] TOWED HYDROPHONE STREAMER WITH INTEGRATED MODULE COUPLER

[75] Inventors: Charles L. Morningstar, deceased, late of Lewisville, by Kelly L. Morningstar, executor; James K. Andersen, Trophy Club, both of Tex.

[73] Assignee: Whitehall Corporation, Dallas, Tex.

[21] Appl. No.: 342,845

[22] Filed: Nov. 21, 1994

[51] Int. Cl.$^6$ ............................ H04R 13/00; H01R 13/62
[52] U.S. Cl. .......................................... 367/154; 439/194
[58] Field of Search .................. 367/154, 20; 174/101.5; 439/191, 194

[56] References Cited

U.S. PATENT DOCUMENTS

| | | | |
|---|---|---|---|
| 2,708,742 | 5/1955 | Harris | 340/7 |
| 2,782,059 | 2/1957 | Stranberg | 285/247 |
| 3,177,016 | 4/1965 | Holmgren | 285/247 |
| 3,812,455 | 5/1974 | Pearson | 367/154 |
| 4,204,188 | 5/1980 | Weichart et al. | 367/154 |
| 4,260,211 | 4/1981 | Mollere | 367/20 |
| 4,346,954 | 8/1982 | Appling | 367/154 |
| 4,351,036 | 9/1982 | Mollere | 367/154 |
| 4,437,689 | 3/1984 | Goebel et al. | 285/246 |
| 4,736,969 | 4/1988 | Fouts | 285/247 |
| 5,388,926 | 2/1995 | Stottlemyer | 367/154 |

*Primary Examiner*—Charles T. Jordan
*Assistant Examiner*—Theresa M. Wesson
*Attorney, Agent, or Firm*—Hitt Chwang & Gaines

[57] ABSTRACT

An integrated module coupler for a towed hydrophone streamer and a method of transmitting towing forces and electrical signals therethrough. The coupler comprises: (1) a coupler body having a plurality of axial bores and a plurality of tension member apertures therethrough, (2) a plurality of electrically-conductive pins disposed through the bores, (3) an insulating material, disposed between the plurality of pins and walls of the plurality of bores, for insulating the pins from the coupler body to thereby allow electrical signals to pass via the plurality of pins through the body, (4) means for retaining tension members within each of the tension member apertures, the retaining means allowing the tension members to terminate within the tension member apertures in an eye, the retaining means passing through each of the eyes to thereby engage the tension member and (5) a coupler shell, coaxial with and capturing the coupler body to engage a mating coupler shell of another coupler, towing forces transmittable between the coupler shell and the tension members via the coupler body and the retaining means.

20 Claims, 4 Drawing Sheets

TOWED HYDROPHONE STREAMER WITH INTEGRATED MODULE COUPLER

CROSS-REFERENCE TO RELATED APPLICATIONS

This application is related to the following U.S. patent applications:

| Serial/ Registration Number | Title | Filing/ Issue Date |
|---|---|---|
| U.S. Pat. No. 5,400,298 | TOWED HYDROPHONE STREAMER WITH DISTRIBUTED ELECTRONICS HOUSINGS | Issued 3/21/1995 |
| Ser. No. 08/126,304 | TELEMETRY DATA TRANSMISSION CIRCUIT HAVING SELECTABLE CLOCK SOURCE | Filed 09/23/1993 |
| U.S. Pat. No. 5,412,621 | ENCAPSULATED HYDROPHONE ELEMENT FOR TOWED HYDROPHONE ARRAY | Issued 05/02/1995 |
| Ser. No. 08/125,562 | TELEMETRY TRANSMISSION PROTOCOL FOR TOWED HYDROPHONE STREAMER | Filed 09/23/1993 Now Abandoned |
| U.S. Pat. No. 5,450,369 | TELEMETRY TRANSMISSION PROTOCOL FOR TOWED HYDROPHONE STREAMER | Issued 09/12/1995 |
| Ser. No. 08/403,478 | TELEMETRY TRANSMISSION PROTOCOL FOR TOWED HYDROPHONE STREAMER | Filed 03/14/1995 |
| U.S. Pat. No. 5,367,499 | VIBRATION ISOLATION MODULE FOR TOWED HYDROPHONE STREAMER | Issued 11/22/1994 |
| Ser. No. 08/342,306 | DUAL ROPE VIBRATION ISOLATION MODULE FOR TOWED HYDROPHONE STREAMER | Filed 11/18/1994 |
| U.S. Pat. No. 5,408,442 | HYDROPHONE ELEMENT WITH FILTER CIRCUIT | Issued 04/18/1995 |
| Ser. No. 08/126,064 | DATA COLLECTION AND RELAY CIRCUIT FOR TOWED HYDROPHONE ARRAY | Filed 09/23/1993 |

The above-listed applications are commonly assigned with the present invention and are incorporated herein by reference as if reproduced herein in their entirety.

TECHNICAL FIELD OF THE INVENTION

The present invention is directed, in general, to towed hydrophone streamers and, more particularly, to couplers for modules within the towed array that provide both mechanical and electrical connections among the modules.

BACKGROUND OF THE INVENTION

It is now common practice to explore the oceans of the earth for deposits of oil, gas and other valuable minerals by seismic techniques in which an exploration vessel imparts an acoustic wave into the water, typically by use of a compressed air "gun." The acoustic wave travels downwardly into the sea bed and is reflected at the interfaces between layers of materials having varying acoustic impedances. The wave travels back upwardly where it is detected by microphone or "hydrophone" elements in a streamer towed by the vessel to yield information regarding characteristics of the underwater material and structures.

A towed streamer comprises a plurality of pressure-sensitive hydrophone elements enclosed within a waterproof jacket and electrically coupled to recording equipment onboard the vessel. Each hydrophone element within the streamer is designed to convert the mechanical energy present in pressure variations surrounding the hydrophone element into electrical signals. Due to its often extreme length (on the order of kilometers), the streamer is divided into a number of separate sections or "modules" that can be decoupled from one another and that are individually waterproof. Individual streamers can be towed in parallel through the use of paravanes to create a two dimensional array of hydrophone elements. Data buses running through each of the modules in the streamer carry the signals from the hydrophone elements to the recording equipment (so-called "acoustic data").

In addition to acoustic data, it is also important to collect and transmit data concerning operational status of the array to the vessel (so-called "nonacoustic data"). Nonacoustic data comprises physical characteristics of interest regarding the operation of each module, including whether water has invaded a module in the streamer, module temperature, module depth and power supply voltage.

Today, many towed arrays have digital data channels. The primary advantage of digital data transmission is its ability to handle a significantly greater number of sensors for a given streamer size. For example, streamers with a thousand or more sensors would be of an impractical large diameter to simply contain the analog bus conductors therein. Also, with digital data transmission, data transmission rates are higher and, with proper attention to shielding of electromagnetic interference, data fidelity is maintained from the hydrophone to the recording equipment.

While under tow, towed arrays undergo stretching forces on the order of several thousand pounds. These forces must be transmitted through and between each module.

Accordingly, what is needed in the art is an improved coupler for joining two modules of a towed array together. The coupler must not only provide for mechanical transmission of significant towing forces but must also provide low noise electrical coupling between the modules so sensitive digital data may be transferred therebetween.

SUMMARY OF THE INVENTION

To address the above-discussed deficiencies of the prior art, it is a primary object of the present invention to provide an integrated coupler that transmits both electrical signals and significant towing forces.

In the attainment of the above primary object, the present invention provides an integrated module coupler for a towed hydrophone streamer and a method of transmitting towing forces and electrical signals therethrough. The coupler comprises: (1) a coupler body having a plurality of axial bores and a plurality of tension member apertures therethrough, (2) a plurality of electrically-conductive pins disposed through the bores, (3) an insulating material, disposed between the plurality of pins and walls of the plurality of bores, for insulating the pins from the coupler body to thereby allow electrical signals to pass via the plurality of pins through the body, (4) means for retaining tension members within each of the tension member apertures, the retaining means allowing the tension members to terminate within the tension member apertures in an eye, the retaining means passing through each of the eyes to thereby engage the tension member and (5) a coupler shell, coaxial with and capturing the coupler body to allow the coupler shell to engage a mating coupler shell of another coupler, towing forces transmittable between the coupler shell and the tension members via the coupler body and the retaining means.

Thus, the coupler provides an integrated structure adapted to carry towing forces on the order of several thousand pounds without sacrificing reliable electrical contact in the plurality of pins.

In a preferred embodiment of the present invention, the coupler shell comprises a mating surface rotatably to engage the coupler shell with a corresponding mating surface of the mating coupler shell. In this embodiment, the coupler shell is not designed to withstand significant rotational forces. The coupler shell transmits axial forces.

In a preferred embodiment of the present invention, the retaining means comprises a pin passing through each of the tension member apertures and the corresponding eyes of the tension members. The pin, referred to more specifically as a clevis pin, is fixed within the coupler body and provides a structure against which the eyed-end of the tension members may bear. Of course, in lieu of a clevis pin, the coupler body may include an integral span within the stress member apertures that performs the same function.

In a preferred embodiment of the present invention, the tension members comprise a relatively inextensible rope. Those of skill in the art will recognize that it is within the scope of the invention to provide extensible rope, should damping be a concern. However, as it is generally undesirable to integrate damping qualities into a hydrophone module, inextensible tension members are preferred. In a more preferred embodiment, the tension members are composed of liquid crystal polymer rope approximately 5/32" in diameter and commercially available from Hoecht-Celanese under the tradename Vectran™.

In a preferred embodiment of the present invention, the coupler body is provided with alignment pin apertures axially defined therein, the alignment pin apertures adapted to receive corresponding alignment pins from a mating coupler body associated with the mating coupler shell. In a related embodiment, the plurality of pins are adapted to couple with a corresponding plurality of receptacles in a mating coupler body, the coupler body including means for aligning the plurality of pins with the corresponding plurality of receptacles. The alignment pins therefore preferably perform a dual function: (1) to align the two coupler bodies axially with respect to one another and (2) to ensure that the two coupler bodies are rotationally registered, such that there is only one relative position between the two coupler bodies that allows engagement. This allows the alignment pins to transmit any rotational forces, since the coupler shell is preferably not so designed.

In a preferred embodiment of the present invention, the coupler body is provided with an integral sensor. The integral sensor may be of any type, such as temperature, acceleration or strain. However, in a more preferred embodiment, the sensor is a pressure sensor disposed within a cavity within the coupler body. The pressure sensor allows knowledge of the depth of the coupler.

In a preferred embodiment of the present invention, the coupler body and the coupler shell are composed of titanium. This allows the coupler to transmit sizeable towing forces, again, on the order of several thousand pounds.

In a preferred embodiment of the present invention, the coupler body comprises a first portion having the plurality of axial bores therethrough and a second portion having the plurality of tension member apertures therethrough. In the embodiment to be illustrated, the coupler body is shown as existing in two portions. However, this is for manufacturing convenience. The two portions can, in fact, be embodied in a single unit.

In a preferred embodiment of the present invention, the coupler is located at an end of a module, the module comprising a spaced-apart plurality of hydrophones located within a fluid-resistant jacket. Thus, the coupler is designed to be a part of a module in a towed hydrophone streamer. The coupler transitions towing forces and carries acoustic and nonacoustic electrical signals between the modules.

The foregoing has outlined rather broadly the features and technical advantages of the present invention so those of ordinary skill in the art will better understand the detailed description of the invention that follows. Additional features and advantages of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
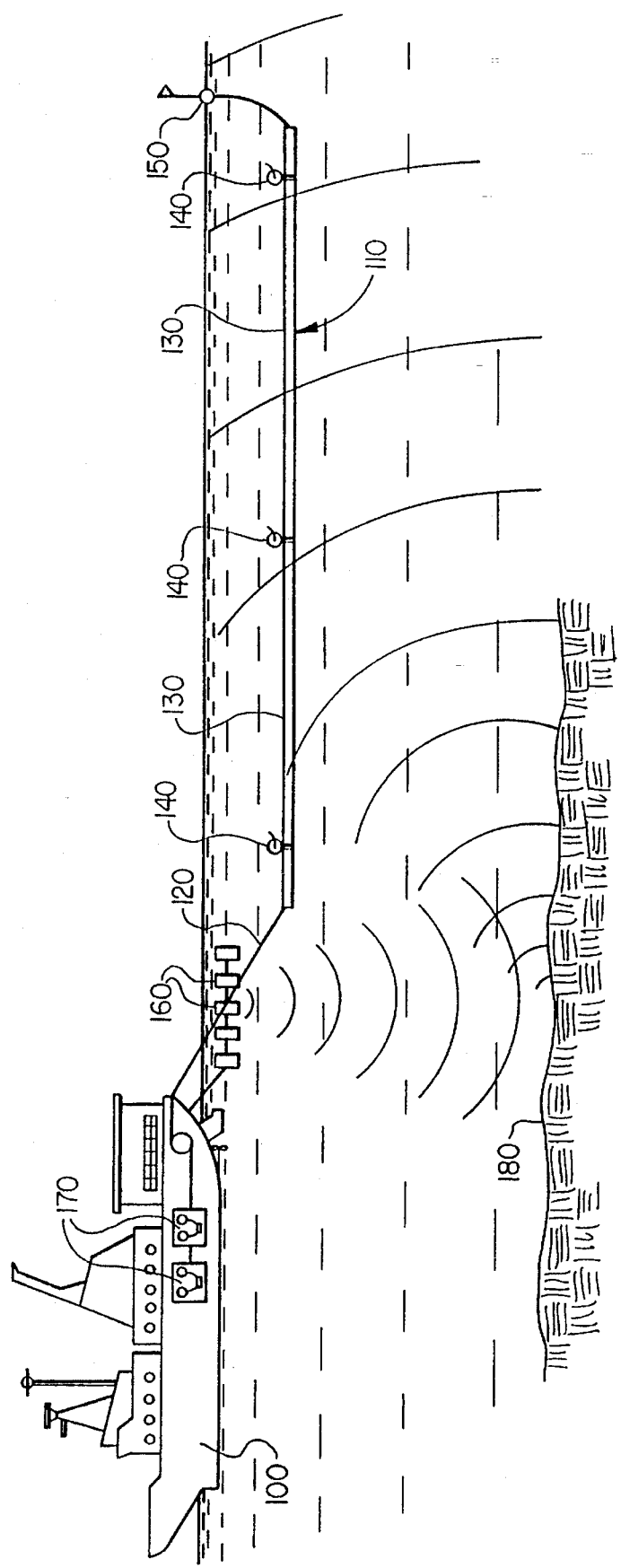
FIG. 1 illustrates an elevational view representing a towed array in operation.

Referring initially to FIG. 1, illustrated is an elevational view representing a towed array in operation. A seismic exploration vehicle 100 tows a streamer 110 behind it by way of a tow cable 120. The streamer 110 may comprise a rear buoy 150 if necessary. The streamer 110 is additionally provided with one or more leveling devices or "birds" 140 which serve to regulate the depth of the streamer 110 within the water. The seismic vessel also tows compressed air guns 160 or other sources of acoustic energy which generate an acoustic wave in the water which travels downwardly as shown, reflects at interfaces within the sea bed 180 and is detected by the hydrophones of the streamer 110. As described in more detail below, the analog signals generated by the hydrophones within the streamer 110 upon receipt of the reflected wave are converted to digital format by analog-to-digital converters also comprised in the streamer 110 and are transmitted in digital form along the streamer 110 and up the tow cable 120 to be recorded by digital recording devices 170 on board the ship 100. The streamer 110 comprises a plurality of modules 130. Each module 130 comprises a plurality of hydrophone assemblies (individually referenced in FIG. 2). The modules 130 are connectible to each other in various numbers to make the streamer 110 any length desired, up to a practical maximum length.

Figure 2:
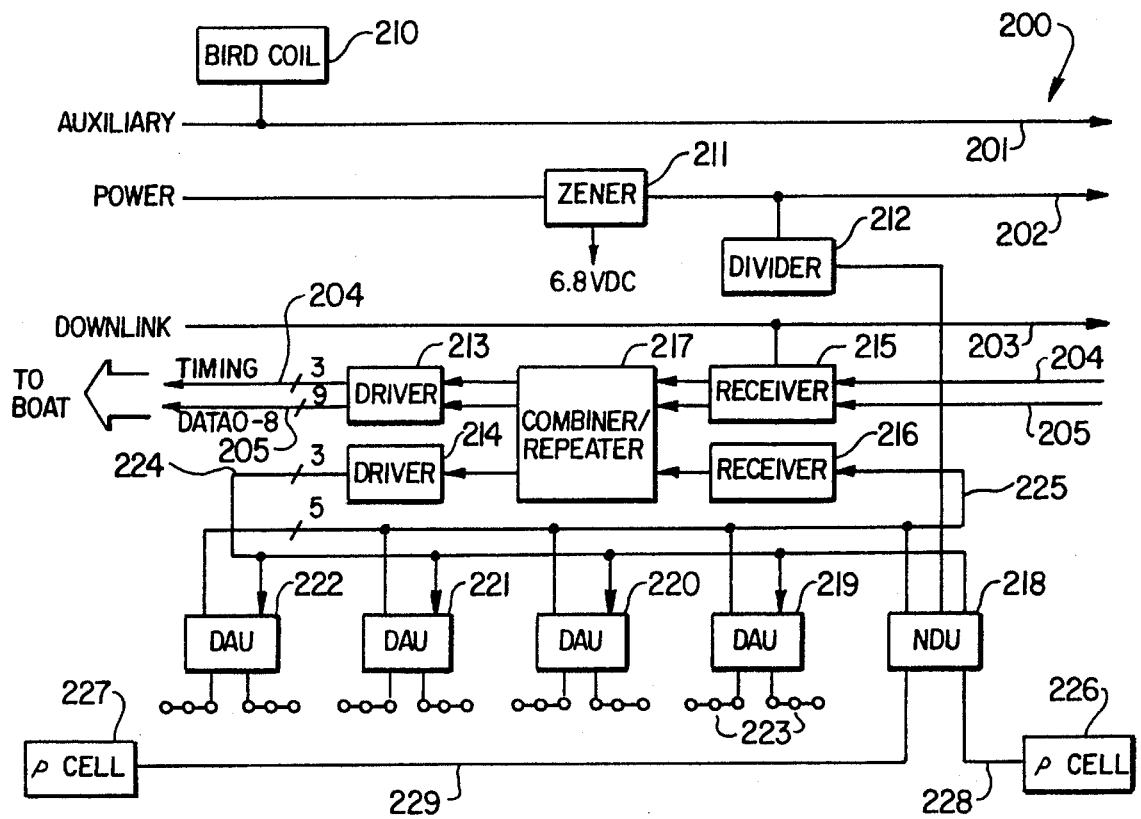
FIG. 2 illustrates a block diagram of an overall digital data system for a towed array module in the array of FIG. 1.

Turning now to FIG. 2, illustrated is a block diagram of an overall digital data system for a towed array module in the array of FIG. 1. A digital bus 200 is, in a preferred embodiment of the present invention, comprised of twisted-pair wire.

The bus 200 is divided into an auxiliary bus 201, a power bus 202, a downlink bus 203, a timing bus 204 and a combined acoustic/nonacoustic data bus 205. The auxiliary bus 201 is used, among other things to carry signals that are inductively transmitted to one of a plurality of birds (not shown) via a bird coil 210. Although the power bus 202 is a current bus and not a voltage bus, it nonetheless carries relatively high voltages (on the order of several hundred volts) at the front of the streamer 110. A zener diode 211 removes a portion of this voltage in each of the many modules within the array to provide, in a preferred embodiment, 6.8 volts to each module. Each of the separate housings in the module is provided with further voltage regulation. A divider 212 supplies this voltage to an input on a nonacoustic data unit ("NDU") 218 that embodies the data collection and relay circuit of the present invention. This allows the NDU 218 to detect whether the module is receiving sufficient power and to transmit an indication of the power level to the seismic exploration vehicle 100 of FIG. 1. For purposes of the present invention, nonacoustic data is defined as all data other than data acquired through the hydrophones. This includes temperature measurements, depth measurements, voltage measurements or NDU status information.

The downlink bus 203 receives downlink commands from the seismic exploration vehicle 100, delivering the downlink commands to various components within the array, including the NDU 218. The timing bus 204 carries synchronizing clock signals throughout each module in the array to allow the components therein to work in concert. The data bus 205 carries both the acoustic data derived from the hydrophones within the array and the nonacoustic data derived from nonacoustic sensors coupled to the NDU 218 in the form of interleaved packets. Data are arranged within the packets in an order representing the module order within the array.

The timing and data buses 204, 205 enter a receiver 215 where packets thereon (derived from modules behind the one shown) are buffered and transmitted therefrom into a combiner/repeater unit ("CRU") 217, serving to combine the packets with acoustic and nonacoustic data derived from the module shown (and buffered in a receiver 216) into revised packets. These revised packets are transmitted to the next module via a driver 213. The CRU 217 also feeds another driver 214 which serves to coordinate the operation of a plurality of acoustic data acquisition units ("DAUs") 219, 220, 221, 222 via a local timing bus 224. Each of the DAUs 219, 220, 221, 222 communicates with a plurality of hydrophones, representationally referenced as hydrophones 223. The output from the DAUs 219, 220, 221, 222 is fed to the receiver 216 for injection into the data stream of packets on the data bus 205 via a local data bus 225.

Also providing data to the receiver 216 is the NDU 218. The NDU 218 receives timing and downlink commands via the local timing bus 224 and supplies nonacoustic data to the receiver 216 via the local data bus 225. Again, the receiver 216 acts as a buffer for the data prior to entering the CRU 217 for injection into the main data stream. In addition to deriving local module voltage from the divider 212, the NDU 218 detects saltwater invasion via conductivity sensors ("Rho cells") 226, 227 via respective lines 228, 229. The drivers 213, 214, the receivers 215, 216, the CRU 217, the NDU 218 and the DAUs 219, 220, 221, 222 are housed in separate housings within and distributed throughout the module 130.

Figure 3:
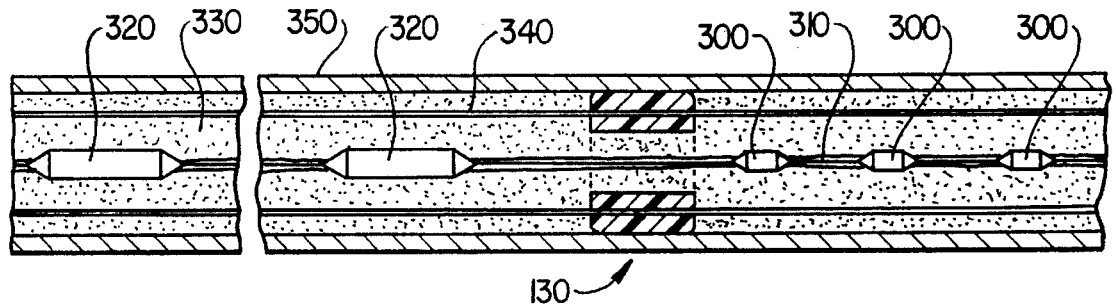
FIG. 3 illustrates a partial cross-sectional view of a typical module 130 of FIG. 1.

Turning now to FIG. 3, illustrated is a partial cross-sectional view of a typical module 130 of FIG. 1. The module 130 comprises a plurality of hydrophone assemblies 300 joined to each other by electrical cables 310. The electrical cables 310 feed into various data processing and transmission housings (such as digital data acquisition units and repeater units) 320 spread along a length of the module 130. An open-cell foam 330 and tension cables 340 reside within a waterproof jacket 350. The foam 330 laterally suspends the hydrophone assemblies 300 and the housings 320 therein and provides a surface suitable for longitudinally fixing the various housings 320 in a relatively stable spaced-apart relationship along the length of the module 130. Maintenance of this spaced-apart relationship is important to proper operation of the array because the phase of signals produced by the hydrophone array in response to pressure wave impingement is a function of hydrophone spacing.

The tension cables 340 are used to carry pulling forces generated by the towing vessel and transmitted down the towed array while it is under tow, thereby relieving the cables 310, the jacket 350 and other structures within the jacket 350 from this stress. A fill fluid having a certain desired specific gravity is entrained within the open cell foam 330. This fill fluid is chosen such that, when taken as a whole, the module has a certain desired specific gravity, preferably a neutral buoyancy with respect to sea water so as to minimize effort on the part of the "birds."

Traditionally, the entrained fill fluid is an aliphated hydrocarbon, although many other fluids have been considered. The specific gravity of the fill fluid is of primary concern. The fill fluid should also not materially attenuate the pressure wave impinging on the streamer 110. Finally, the fill fluid should be relatively chemically inert, such that the fluid does not harm components within the streamer 110. In a preferred embodiment of the present invention, the fill fluid is sold under the name NorPar 12™ and is an aliphated hydrocarbon.

Figure 4:
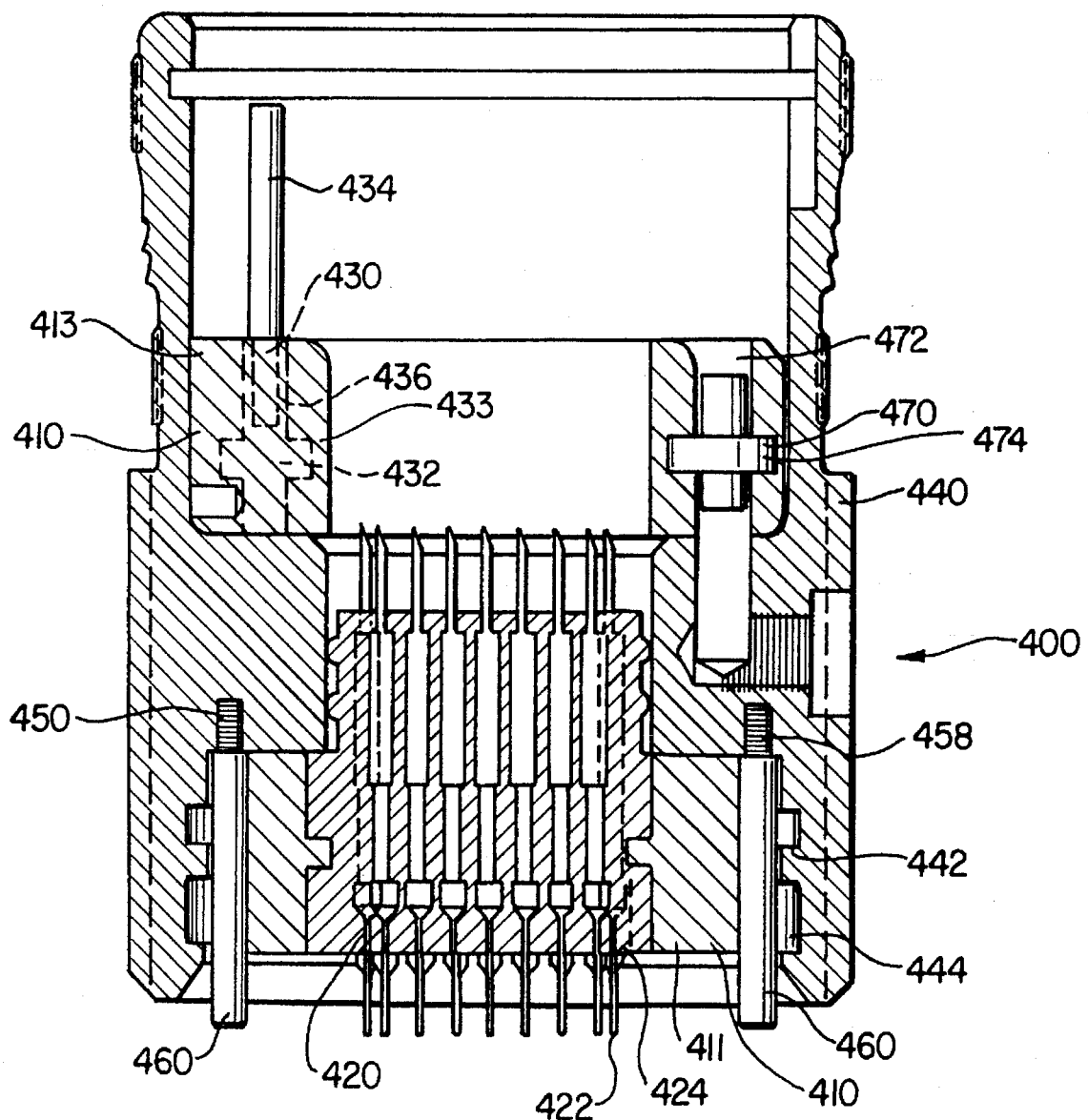
FIG. 4 illustrates a female coupler embodying the present invention.
Figure 5:
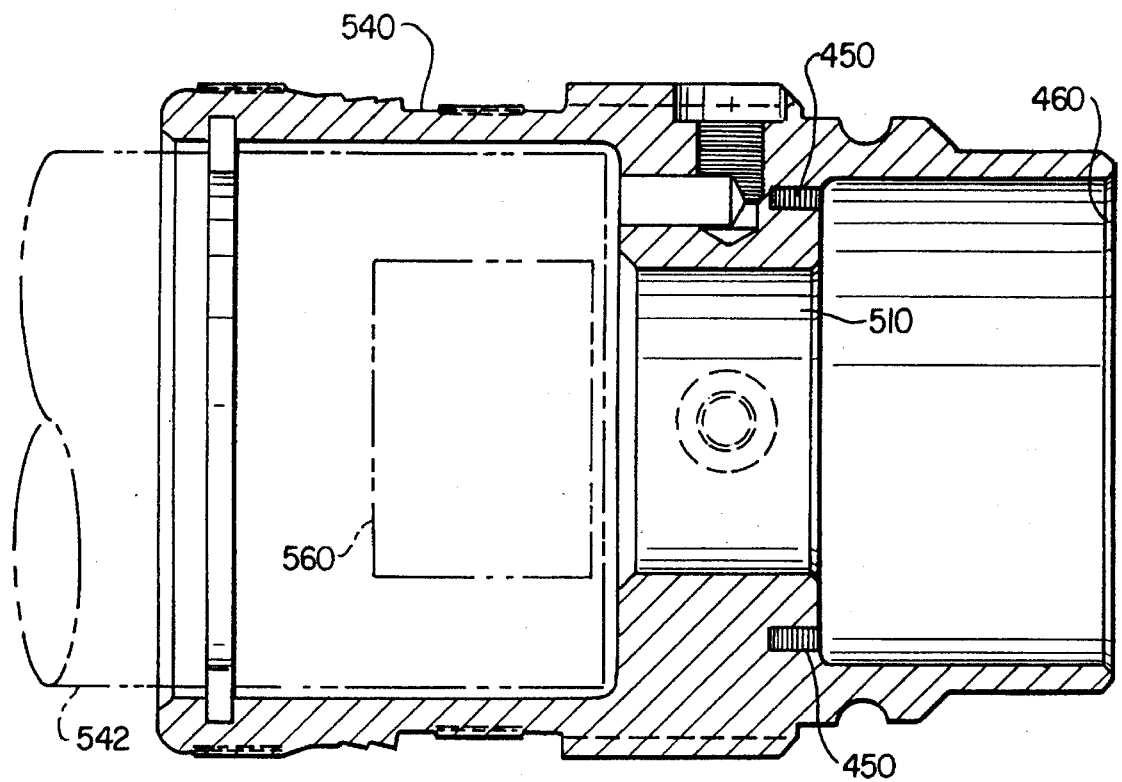
FIG. 5 illustrates a male coupler shell adapted to mate with the female coupler of FIG. 4.

Turning now jointly to FIGS. 4 and 5, illustrated are a female coupler 400 embodying the present invention and a male coupler shell adapted to mate with the female coupler of FIG. 4. Again, it is a primary object of the present invention to provide an integrated coupler that transmits both electrical signals and significant towing forces.

Therefore, the illustrated embodiment of the present invention comprises a coupler body 410. The coupler body 410 has a plurality of axial bores 420 and a plurality of tension member apertures 430 therethrough. A plurality of electrically-conductive pins 422 are disposed through the bores 420. An insulating material 424 is disposed between the plurality of pins 422 and walls of the plurality of bores 420. The insulating material 424 insulates the pins 422 from the coupler body 410 to thereby allow electrical signals (not shown) to pass via the plurality of pins 422 through the coupler body 410. The coupler 400 further comprises, in a general sense, means 432 for retaining tension members 434 within each of the tension member apertures 430. The retaining means 432 allow the tension members 434 to terminate within the tension member apertures 430 in an eye 436. The retaining means 432 pass through each of the eyes 436 to thereby engage the tension members 434.

A coupler shell 440 is coaxial with and captures the coupler body 410 to allow the coupler shell 440 to engage a mating coupler shell 540 of another coupler 500 (FIG. 5). Towing forces are therefore transmittable between the coupler shell 440 and the tension members 434 via the coupler body 410 and the retaining means 432. Thus, the coupler 400 provides an integrated structure adapted to carry towing forces on the order of several thousand pounds without sacrificing reliable electrical contact in the plurality of pins 422.

In the illustrated embodiment, the coupler shell 440 comprises an inner mating surface 442 rotatably to engage the coupler shell 440 with a corresponding mating surface 542 of the mating coupler shell 540 (again, to be shown in FIG. 5). Mating is preferably accomplished by capturing a plurality of ball bearings in a bearing race (not shown) disposed within an annular recess 444 in the inner mating surface 442. Absent the ball bearings, the coupler shell 440 and mating coupler shell 540 can be separated. With the ball bearings in place, the coupler shell 440 and mating coupler shell 540 can withstand several thousand pounds of separating force. Thus, in the illustrated embodiment, the coupler shell 440 is not designed to withstand significant rotational forces. The coupler shell 440 transmits only axial forces to the coupler body 410.

In the illustrated embodiment, the retaining means 432 comprises a pin 433 passing through each of the tension member apertures 430 and the corresponding eyes 436 of the tension members 434. The pin 433, referred to more specifically as a clevis pin, is fixed within the coupler body 410 and provides a structure against which the eyed-end of the tension members 434 may bear. Of course, in lieu of a clevis pin, the coupler body 410 may include an integral span within the tension member apertures 430 that performs the same function.

In the illustrated embodiment, the tension members 434 comprise a relatively inextensible rope. Those of skill in the art will recognize that it is within the scope of the invention to provide extensible rope (such as polyethylene), should damping be a concern. However, as it is generally undesirable to integrate damping qualities into a hydrophone module, inextensible tension members 434 (such as steel cable) are preferred. In a more preferred embodiment, the tension members 434 are composed of liquid crystal polymer rope approximately 5/32" in diameter and commercially available from Hoecht-Celanese under the tradename Vectran™.

In the illustrated embodiment, the coupler body 410 is provided with alignment pin apertures 450 axially defined therein, the alignment pin apertures 450 adapted to receive corresponding alignment pins 460 from a mating coupler body 510 of FIG. 5 associated with the mating coupler shell 540. The plurality of pins 460 are adapted to couple with a corresponding plurality of receptacles 560 in the mating coupler body 510, the coupler body 410 including means for aligning the plurality of pins with the corresponding plurality of receptacles. In FIG. 4, the means for aligning is the alignment pins, although those of skill in the art will recognize that key structures and splines are within the scope of the present invention. The alignment pins 460 therefore preferably perform a dual function: (1) to align the two coupler bodies 410, 510 axially with respect to one another and (2) to ensure that the two coupler bodies 410, 510 are rotationally registered, such that there is only one relative position between the two coupler bodies 410, 510 that allows engagement. This allows the alignment pins to transmit any rotational forces, since the coupler shell 440 is preferably not so designed.

In the illustrated embodiment, the coupler body 410 is provided with an integral sensor 470. The integral sensor 470 may be of any type, such as temperature, acceleration or strain. However, in a more preferred embodiment, the sensor 470 is a pressure sensor disposed within a cavity 472 within the coupler body 410. The pressure sensor allows knowledge of the depth of the coupler 400 and communicates with a pressure transducer mounted in a recess 474 in the coupler shell 410.

In the illustrated embodiment, the coupler body 410 and the coupler shell 440 are composed of titanium. This allows the coupler 400 to transmit sizeable towing forces, again, on the order of several thousand pounds.

In the illustrated embodiment, the coupler body 410 comprises a first portion 411 having the plurality of axial bores 420 therethrough and a second portion 413 having the plurality of tension member apertures 430 therethrough. As previously mentioned, the two portions 411, 413 can be embodied in a single unit.

In the illustrated embodiment, the coupler 400 is located at an end of a module (such as the module 130 of FIG. 1). Thus, the coupler 410 is designed to be a part of the module 130 in the towed streamer 110. The coupler 410 transitions towing forces and carries acoustic and nonacoustic electrical signals between the modules 130.

Figure 6:
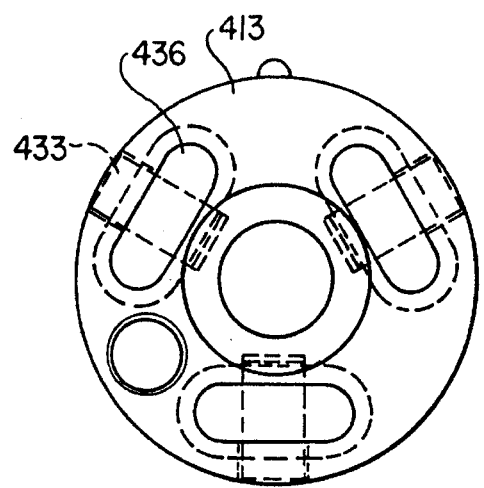
FIG. 6 illustrates an end view of a second portion of a coupler body configured in accordance with the present invention.

Turning now to FIG. 6, illustrated is an end view of a second portion of a coupler body configured in accordance with the present invention. FIG. 6 is presented primarily for the purpose of illustrating the tension member apertures 430 and the retaining means 432 for retaining the tension members 434 within each of the tension member apertures 430. Again, the retaining means 432 comprises a pin 433 passing through each of the tension member apertures 430 and the corresponding eyes 436 of the tension members 434. The pin 433, referred to more specifically as a clevis pin, is fixed within the coupler body 410 and provides a structure against which the eyed-end of the tension members 434 may bear. Of course, in lieu of a clevis pin, the coupler body 410 may include an integral span within the tension member apertures 430 that performs the same function.

From the above, it is apparent that the present invention provides an integrated module coupler for a towed hydrophone streamer and a method of transmitting towing forces and electrical signals therethrough. The coupler comprises: (1) a coupler body having a plurality of axial bores and a plurality of tension member apertures therethrough, (2) a plurality of electrically-conductive pins disposed through the bores, (3) an insulating material, disposed between the plurality of pins and walls of the plurality of bores, for insulating the pins from the coupler body to thereby allow electrical signals to pass via the plurality of pins through the body, (4) means for retaining tension members within each of the tension member apertures, the retaining means allowing the tension members to terminate within the tension member apertures in an eye, the retaining means passing through each of the eyes to thereby engage the tension member and (5) a coupler shell, coaxial with and capturing the coupler body to engage a mating coupler shell of another coupler, towing forces transmittable between the coupler shell and the tension members via the coupler body and the retaining means.

Although the present invention and its advantages have been described in detail, those of ordinary skill in the art should understand that various changes, substitutions and alterations can be made herein without departing from the spirit and scope of the invention in its broadest form.

What is claimed is:

1. An integrated module coupler for a towed hydrophone streamer, comprising:

a coupler body having a plurality of axial bores and a plurality of tension member apertures therethrough;

a plurality of electrically-conductive pins disposed through said bores;

an insulating material, disposed between said plurality of pins and walls of said plurality of bores, for insulating said pins from said coupler body to thereby allow electrical signals to pass via said plurality of pins through said body;

means for retaining tension members within each of said tension member apertures, said retaining means allowing said tension members to terminate within said tension member apertures in an eye, said retaining means passing through each of said eyes to thereby engage said tension member; and a coupler shell, coaxial with and capturing said coupler body to allow said coupler shell to engage a mating coupler shell of another coupler, towing forces transmittable between said coupler shell and said tension members via said coupler body and said retaining means.

2. The coupler as recited in claim 1 wherein said coupler shell comprises a mating surface rotatably to engage said coupler shell with a corresponding mating surface of said mating coupler shell.

3. The coupler as recited in claim 1 wherein said retaining means comprises a pin passing through each of said tension member apertures and said corresponding eyes of said tension members.

4. The coupler as recited in claim 1 wherein said tension members comprise a relatively inextensible rope.

5. The coupler as recited in claim 1 wherein said coupler body is provided with alignment pin apertures axially defined therein, said alignment pin apertures adapted to receive corresponding alignment pins from a mating coupler body associated with said mating coupler shell.

6. The coupler as recited in claim 1 wherein said coupler body is provided with an integral sensor.

7. The coupler as recited in claim 1 wherein said plurality of pins are adapted to couple with a corresponding plurality of receptacles in a mating coupler body, said coupler body including means for aligning said plurality of pins with said corresponding plurality of receptacles.

8. The coupler as recited in claim 1 wherein said coupler body and said coupler shell are composed of titanium.

9. The coupler as recited in claim 1 wherein said coupler body comprises a first portion having said plurality of axial bores therethrough and a second portion having said plurality of tension member apertures therethrough.

10. The coupler as recited in claim 1 wherein said coupler is located at an end of a module, said module comprising a spaced-apart plurality of hydrophones located within a fluid-resistant jacket.

11. A method of transmitting towing forces and electrical signals through an integrated module coupler for a towed hydrophone streamer, comprising the steps of:

a coupler body having a plurality of axial bores and a plurality of tension member apertures therethrough;

transmitting said electrical signals through a plurality of electrically-conductive pins disposed through a plurality of axial bores located within a coupler body, an insulating material, disposed between said plurality of pins and walls of said plurality of bores, insulating said pins from said coupler body;

transferring said towing forces between a means for retaining tension members within each of a plurality of tension member apertures located within said coupler body, said retaining means allowing said tension members to terminate within said tension member apertures in an eye, said retaining means passing through each of said eyes to thereby engage said tension member; and further transferring said towing forces through a coupler shell, coaxial with and capturing said coupler body to allow said coupler shell to engage a mating coupler shell of another coupler, said towing forces thereby transmittable between said coupler shell and said tension members via said coupler body and said retaining means.

12. The method as recited in claim 11 further comprising the step of rotatably engaging a mating surface of said coupler shell with a corresponding mating surface of said mating coupler shell.

13. The method as recited in claim 11 further comprising the step of passing said towing forces through a pin through each of said tension member apertures and said corresponding eyes of said tension members.

14. The method as recited in claim 11 wherein said tension members comprise a relatively inextensible rope.

15. The method as recited in claim 11 further comprising the step of providing said coupler body with alignment pin apertures axially defined therein, said alignment pin apertures adapted to receive corresponding alignment pins from a mating coupler body associated with said mating coupler shell.

16. The method as recited in claim 11 further comprising the step of providing said coupler body with an integral sensor.

17. The method as recited in claim 11 further comprising the step of coupling said plurality of pins with a corresponding plurality of receptacles in a mating coupler body, said coupler body including means for aligning said plurality of pins with said corresponding plurality of receptacles.

18. The method as recited in claim 11 wherein said coupler body and said coupler shell are composed of titanium.

19. The method as recited in claim 11 further comprising the step of providing a two-part coupler body comprising a first portion having said plurality of axial bores therethrough and a second portion having said plurality of tension member apertures therethrough.

20. The method as recited in claim 11 further comprising the step of locating said coupler at an end of a module, said module comprising a spaced-apart plurality of hydrophones located within a fluid-resistant jacket.

* * * * *